Aug. 13, 1935.   W. UHL ET AL   2,011,092
TYPE BAR AND HOLDER THEREFOR
Filed Dec. 14, 1932   2 Sheets-Sheet 1
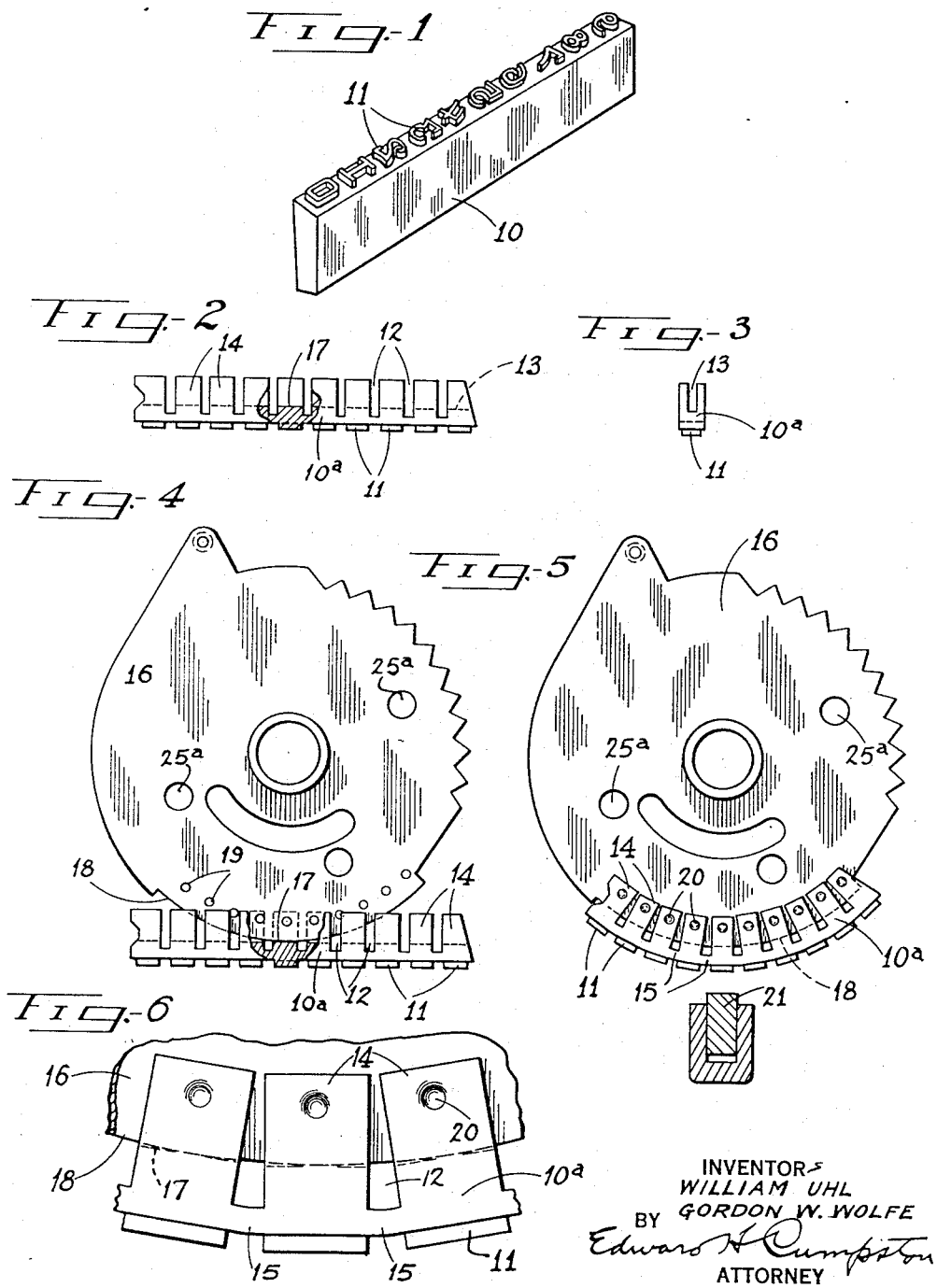

Patented Aug. 13, 1935

2,011,092

UNITED STATES PATENT OFFICE 2,011,092

TYPE BAR AND HOLDER THEREFOR

William Uhl and Gordon W. Wolfe, Rochester, N. Y., assignors to The Todd Company, Inc., Rochester, N. Y., a corporation of New York Application December 14, 1932, Serial No. 647,172

13 Claims. (Cl. 101—396)

The present invention relates to a type bar or block and to a method of and apparatus for producing the same, one object being to provide an improved method of forming the type characters upon the bar which will afford economies in the manufacture of the same and by which the type can be accurately produced in a manner to increase its efficiency and to improve the character of the printing resulting from its use.

Another object of the invention is to provide an improved method of forming the type characters upon bars or blocks which involves the heating of the same to a forging temperature preparatory to placing the bar within or in engagement with a suitable die having characters corresponding to those to be produced into which the heated metal is forced or made to flow by means operated to produce a high degree of pressure upon the heated bar such, for example, as a power operated plunger.

Another object of the invention is to provide an improved method of constructing or conditioning the bars for application to a holder or carrier as well as an improved method of applying the same to the holder or to any suitable supporting means.

Another object of the invention is to provide an improved method of shaping or forming the bars upon a mandrel or the like to condition them for application to a carrier or operating part.

A still further object of the invention is to provide as an article of manufacture an improved unitary type section or bar containing the type characters and designed to facilitate the shaping and the application of the bar to a suitable support or holding device.

A further object of the invention is to provide improved apparatus for applying the type bars to the supporting or holding devices therefor to cause them to substantially conform to the shape or contour thereof, as well as an improved method of securing the bars upon the holding devices.

To these and other ends the invention resides in certain improvements and combinations of parts, all as will be hereinafter more fully described, the novel features being pointed out in the claims at the end of the specification.

In the drawings:

Fig. 1 is a view illustrating one form of type bar constructed in acordance with the method described herein;

Fig. 2 is a part sectional elevation of the bar as it appears after having been slotted or conditioned for application to the holding means therefor;

Fig. 3 is an end elevation of the same;

Fig. 4 is a view in elevation showing the type bar positioned upon a holding disk or segment ready to be bent into final position thereon;

Fig. 5 is a similar view showing the type bar applied to the type holding disk and illustrating its relation to the platen when at normal inoperative position;

Fig. 6 is a fragmentary view drawn to an enlarged scale showing the bar bent at the points between the type characters and illustrating the method of securing it upon the holder;

The same reference numerals throughout the several views indicate the same parts.

Figure 7:
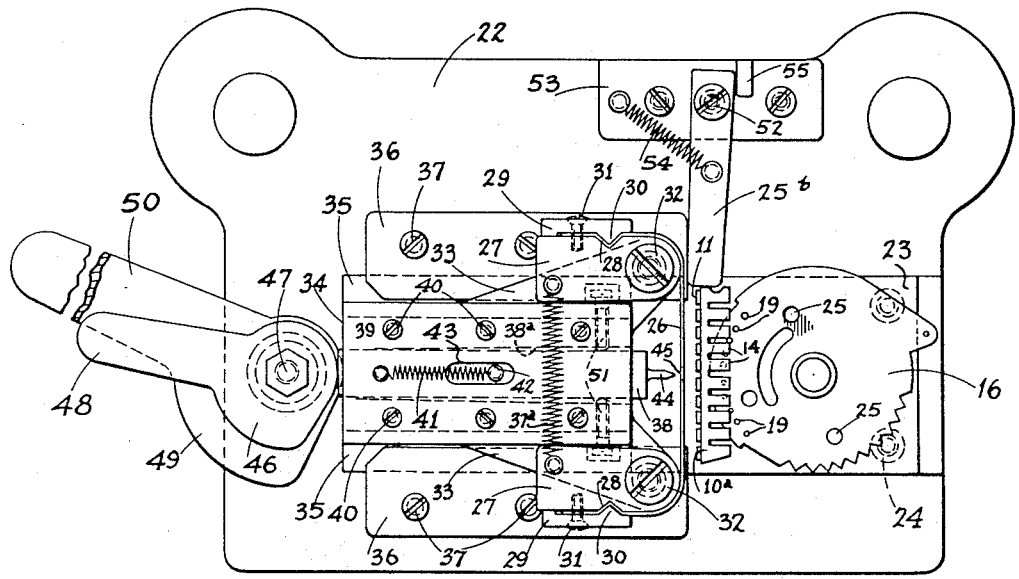
Fig. 7 is a plan view of apparatus for supporting the holding disk and the type bar and for positioning and bending the bar to conform substantially to the contour of the disk.

The type bar or block shown and described herein may be employed in various forms of printing apparatus one of which, by way of example, is represented by the machine shown in United States Patent No. 1,787,234, for a Check writer, issued December 30, 1930, to Raymond E. Bohrer et al. In this patent the type bars are curved or arcuate in shape. However, it will be understood that the bars shown herein may be made either straight or curved, depending on the nature of the work and the means employed for operating the type. Furthermore, it is preferred to form the type characters on a straight bar and to subsequently shape or condition it as may be required to conform generally to the particular operating part with which it is to be connected.

Heretofore in the construction of type bearing elements for use in different form of printing machines, it has been customary to produce the type by the die casting method, which has been found to be expensive and unsatisfactory, particularly in view of the fact that considerable trouble has been experienced with type thus produced by reason of its brittleness and its tendency to chip when a considerable degree of pressure is applied thereto. This is a particularly serious objection when cast type is used in conjunction with a relatively hard platen, where the type is designed to perforate or shred the material upon which the characters are to be formed as is done, for example, in the case of checkwriting machines where the pressure is greater than in the usual or ordinary printing operations. The brittleness of the type produced by the die casting method is due to the characteristics of the particular group of metals compounded to produce the alloys used in the manufacture of the type.

Furthermore the usual die casting metal is more or less porous and therefore develops defects which often prevent the securing of perfect type characters, not to mention the fact that its lack of toughness and durability render it unsuitable for certain kinds of printing, particularly where it is essential to apply considerable pressure to the type to obtain the desired results.

However, with the present method of forming the type characters the disadvantages of the cast type are avoided. This is true for the reason that the type is formed by the forging method from metallic bars, the material of which has the properties of toughness and durability, as well as that of malleability, so that when the bar is heated to a forging temperature and placed within or in engagement with a die containing the characters to be reproduced, it can be forged or "worked" by the use of a power operated plunger or other member and made to fill the type forming portions of the die, whereby to completely form the type upon the bar so that it will not require machining or other treatment to condition it for use. In this method of forming the type characters it is preferred to use what is known as forging brass which has the characteristics of being malleable to a greater degree than ordinary brass and which when brought to a forging heat can be operated upon within the die to accurately produce the type characters upon the bar. This material preferably comprises an alloy containing approximately 60% of copper, 38% of zinc and 2% of lead, but it will be understood that these proportions may be varied if desired within certain limits. It has been found that in the actual use of the type formed by the present method that it is highly durable and efficient in service and that the characters are better and more accurately formed than those produced by the die casting method and are free from the imperfections of the latter.

Referring to the drawings, 10 represents a type bar or block having any desired type characters formed thereon which in the present disclosure represent the digits from 0 to 9 inclusive.

In the practice of the present method the sections upon which the type characters are to be formed may be cut to the desired lengths from bars of a suitable shape and having the desired cross sectional area, the material being preferably that of forging brass. The cut sections are then brought to a forging heat, after which they are placed in a suitable die constructed to form upon the sections the characters which it is desired to produce. The forging operation is then completed by the use of a power operated plunger or the like, which is caused to operate upon the heated bar within the die to flow or to "work" the metal into the type forming portions thereof.

After forming the type upon the front faces of the bars or sections, as indicated in Fig. 1, by the present method, the sections are milled to the desired size to produce the bars 10ª which are placed in a suitable slotting machine and operated upon to cut the transverse and longitudinal slots 12 and 13, respectively. The transverse slots constitute in effect a series of notches which are cut at points opposite the spacings between the type characters and afford, at each side of the bar a series of tongue-like securing members 14 for engagement with the opposite sides of a type holding element as described hereinafter.

The transverse slots or notches 12 are preferably cut, in what may be termed the rear face of the bar, to a greater depth than the longitudinal slot 13 in order to so weaken the bar at points between the type characters as to insure its bending at such points, as indicated at 15 in Fig. 6, when the bar is shaped on a mandrel or applied to the holding disk 16 in a manner described hereinafter.

By slotting the bar in the manner indicated, the type characters are each supported by a lug or abutment comprising a relatively thick section of material as indicated at 17 in Fig. 4, and it is these parts which are seated upon the curved or peripheral portion 18 of the operating disk when the bar is applied to the disk as shown in Figs. 5 and 6, so that the type characters are firmly supported by the disk during the printing operations.

The operating disk is provided adjacent its peripheral portion 18 with a series of openings 19 into each of which is forced a portion of the metal of the tongue-like parts 14 as indicated at 20 in Figs. 5 and 6, said portions being produced by the use of suitable means as described hereinafter.

It will be understood that the upper face of the platen 21 and the printing faces of the type characters 11 may be roughened if desired in a manner known in the art so that an embossing or shredding action on the paper takes place when it is positioned upon the platen and operated upon by the type.

The application of the type bar to the operating disk 16 may be effected by the use of any means suitable for the purpose. The preferred method of shaping and applying the bar to the disk or other generally curved holder consists in placing it upon the curved portion 18 of the disk as indicated, for example, in Fig. 4 and bending it to conform substantially to the contour of said curved portion as shown in Fig. 5, after which suitable tools, such as a series of punches are caused to simultaneously engage the tongues 14 at points in registry with the openings 19 in the disk to force the material of the tongues, on both sides of the disk, into the openings formed in the latter, thus firmly securing the type bar upon the disk.

While it is preferred to place the central portion of the type bar in engagement with the disk 16 as shown in Fig. 4 and to simultaneously bend or wrap the opposite ends of the bar into position upon the disk and at the same time to employ suitable means to position and hold the bar in proper relation with respect to the disk, it will be understood that this method may be varied if desired as, for example, by fixing one end of the bar and wrapping the remaining portion thereof about the curved portion of the disk.

Furthermore the method of securing the tongues 14 of the bar upon the disk may be effected in a manner other than by the use of a series of punches as, for example, by soldering or brazing or otherwise, as desired. It will be seen therefore that the method of applying the bar to the operating disk or other support contemplates broadly the idea of bending or wrapping it about the curved or convex portion of the support and then employing suitable means to secure it upon the support.

The method further contemplates bending the bar at different points, spaced one from another such, for example, as the points 15 between the type characters where the supporting section of the bar is weakened by cutting the slots 12 to a depth greater than the depth of the longitudinal slot 13. The advantage of this method is that each type character is directly supported by a relatively thick section of metal as indicated at 17, thus avoiding weakening of the type and insuring even pressure thereon when operating it in conjunction with the platen 21 when printing the checks or other sheets. Another advantage resulting from weakening the bar at points between the type characters and bending it at said points is that the metal forming the type proper does not become stretched or curved during the bending operations and the characters therefore are not distorted but remain flat to insure perfectly formed characters upon the sheet to be printed. This method also serves to maintain the type characters in proper spaced relation and in perfect alinement one with another.

Furthermore by providing the transverse slots 12 in the opposite sides of the bar to form the tongues or securing portions 14 the latter do not interfere with the bending of the bar about the weakened points 15 and remain in spaced relation to provide suitable means for attaching the bar to the disk as shown in Fig. 6.

The type operating disk when bending the type bar thereon may be rigidly held in position by any suitable means and the same applies when operating the punches to force the portions 20 of the bar into the openings 19 of the disk, it being preferred to employ the same means for holding the disk during the bending and punching operations.

While it is preferred to construct the type bar supporting and operating means as disks or segments, as shown in the patent referred to above, and to support and operate them in the manner described in said patent when employing them in connection with a checkwriter, it will be understood that they may be suitably applied to any desired form of support or operating member and that their usage is not limited to any particular form of printing apparatus.

By the methods described herein, a new and improved article is provided in the form of a type carrying bar as shown in Fig. 2 which can be applied to any suitable supporting member, either straight or curved, and which has decided advantages in the art to which it relates as pointed out herein.

The method of forming and applying the type bar to the holder comprises generally bringing the bar to a forging heat, positioning the heated bar within a die containing the characters to be produced, forging the bar within the die to form the type characters thereon, subsequently slotting the bar longitudinally thereof and transversely at points between the type characters to weaken the bar at said points, applying the bar to the curved portion of the holder or other forming device, positioning a flexible strip or band-like element in contact with the face of the bar and wrapping said flexible strip about the curved portion of the holder while at the same time bending the bar into engagement with said curved portion and causing it to conform substantially to the contour of the latter. By this method the type bar is accurately formed and applied to the holder and is held in position thereon by the flexible strip or band-like element while operating the punches to secure the tongue-like portions 14 of the bar upon the holder.

It will be understood that the term "curved portion" or "generally curved portion" employed herein, is intended to cover not only the curved part shown at 18 in Fig. 4 of the drawings, but any similar form or shape which approximates such a curve, which may constitute a plurality of angularly disposed faces or otherwise differ in shape from a single straight face or surface.

It will also be understood that instead of bending or shaping the type bar directly upon the holder or support with which it is to be connected for operation, it may be shaped or formed on a mandrel having the desired contour, by the use of the apparatus shown in Figs. 7 and 8, and subsequently applied to and secured upon the holding or supporting part therefor.

Figure 8:
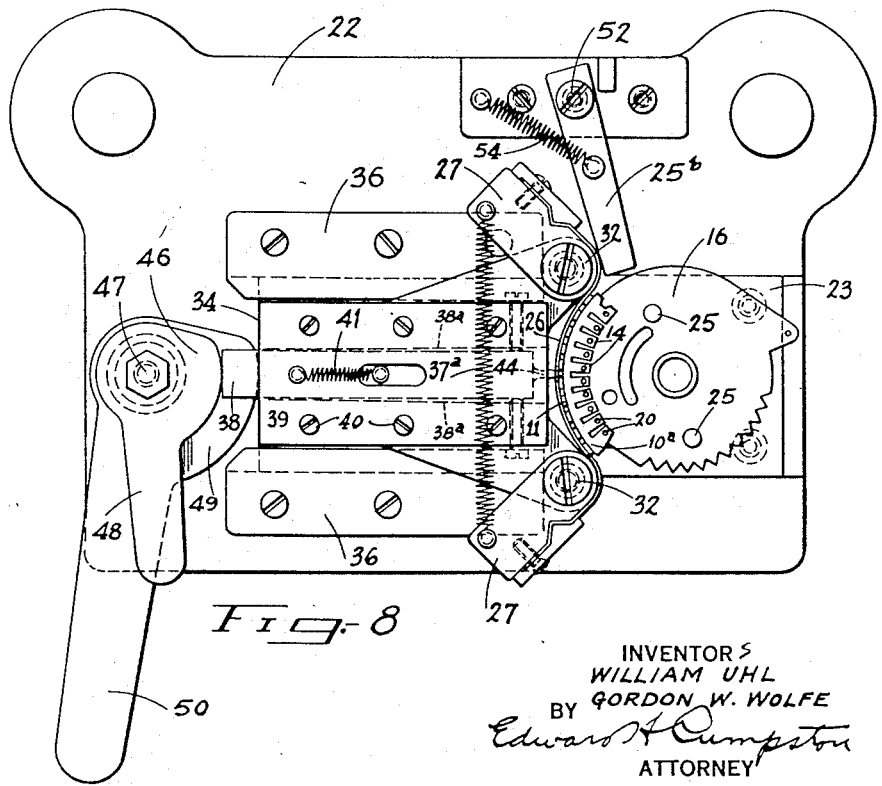
Fig. 8 is a similar view showing the relationship of the parts after being operated to apply the type bar to the holding disk.

While any suitable means may be employed for applying the completed type bars to the holding disks or other supporting means therefor, the preferred means for performing this function is illustrated in Figs. 7 and 8 of the drawings. This means comprises a support or base block 22 preferably adapted for attachment to a punching press, not shown, which is employed to secure the tongues 14 of the type bar to the disk 16 in a manner described hereinafter.

The block is provided at one end with a holding member 23 for the disk 16, the holding member being yieldably supported by springs 24 shown by dotted lines in Fig. 7 and employed for a purpose described hereinafter. The holding member 23 carries upstanding studs 25 which project into the openings 25a of the disk 16 to hold it against lateral displacement when applying the type bar thereto, and to properly position the disk with relation to the type bar.

In positioning the type bar upon the disk 16 preparatory to bending it into engagement therewith its position is accurately determined by means of a stop 25b which engages one end of the bar as shown in Fig. 7.

The means for bending the type bar or for shaping it to conform to the curved portion 18 of the disk preferably comprises a flexible strip of material 26 such, for example, as a steel tape or band-like member normally having its intermediate portion paralleling the type bar as shown in Fig. 7. The ends of the flexible strip 26 are curved around and clamped upon a pair of holding members 27, each of which is notched at 28 to receive the strip. The clamping members are indicated at 29 and are provided with V-shaped portions 30 which engage the ends of the strip within the notches 28 to secure them therein, the clamping members being secured to the holders 27 by means of the screws 31.

The holders 27 are pivoted at 32 upon the arms 33 of a slide block 34 carried by the support 22 and having ribs 35 at its opposite sides. Overlying the ribs are the members 36 which serve to both maintain the slide block in positon upon the support and to form guide means therefor, said members being secured upon the support by the screws or bolts 37.

The holders 27 are normally returned to the position shown in Fig. 7 by means of a spring 37a connected at its opposite ends to the holders and overlying the slide block, which is returned from the operating position shown in Fig. 8 to the normal position shown in Fig. 7 by suitable spring means, not shown.

The block 34 has a longitudinally extending recess 38a in its upper face which is tapered and made somewhat wider at its front end than at its rear end for a purpose described hereinafter. Slidably mounted in said guideway is a positioning and holding member 38 for the type bar 10a which is held in position within the recess by a plate 39 overlying the block 34 and detachably secured thereto by a suitable number of screws 40.

The positioning member 38 is returned from operating position to normal position by a spring 41 overlying the plate 39 and having one end connected therewith and the other end connected with a stud 42 projecting from the positioning member into a slot 43 formed in the plate.

The type bar holding member 38 is provided with a reduced portion 44 arranged to be projected through an opening 45 in the flexible strip 26 to engage the central portion of the type bar at a point between two of the type characters thereon when moved to the operating position shown in Fig. 8.

Movement of the holding member to said operating position is effected by means of a cam 46 arranged to be swung upon a pivotal support 47 by an operating handle 48. Likewise the slide block 34 is adapted to be moved to operating position by a cam 49 arranged to be swung upon the pivotal support by an operating handle 50 normally occupying the position shown in Fig. 7.

The purpose of widening the front end of the recessed guideway 38a of the slide block is to permit of a slight lateral movement therein of the type bar holding member 38 in order that the reduced portion 44 thereof may be properly adjusted with respect to the type bar, it being understood that it is desired to have the part 44 engage the central portion of the type bar between the type characters thereon when in position to hold the bar upon the curved portion 18 of the disk 16. The lateral adjustment of the positioning and holding member 38 is effected by adjusting the screws 51 which are threaded within the block 34 and extend within the recess 38a thereof to engage the opposite sides of the positioning member and to form guide means therefor.

The stop 25b which engages one end of the type bar, as shown in Fig. 7, is mounted to swing upon a pivot member 52 carried by a plate 53 on the support 22. A spring 54 extends between the plate and the stop and is adapted to return the latter from the positon shown in Fig. 8 to the normal position shown in Fig. 7 upon return of the slide 34 to normal position by the spring means operating thereon, not shown. A member 55 secured on the plate 53 operates to limit the movement of the pivoted stop 25b when returning to normal position.

In advance of the operation of the flexible strip 26 to bend the type bar into position upon the supporting disk 16, the cam 46 is moved to the position shown in Fig. 8, during which movement it will advance the positioning member 38 so that the portion 44 thereof will be moved through the opening in the flexible strip and into position to engage, properly position, and firmly hold the type bar upon the supporting disk 16, it being understood that the flexible strip does not in any way injure the type when operating in engagement therewith.

After moving the positioning member into engagment with the type bar the cam 49 is operated to advance the slide block 34 to advance the holders 27 carrying the flexible strip which is thus caused to move into engagement with the type bar. Upon continued advancement of the slide block the holders 27 will swing outwardly and during this outward swinging movement the flexible strip will exert equal pressure on the opposite ends of the type bar, causing it to bend at the various weakened points 15 until all of the parts 17 of the type bar become seated upon the curved portion 18 of the disk as best indicated in Fig. 6. Thus by wrapping the flexible strip about the disk, the type bar is made to conform substantially to the shape thereof.

The cams 46 and 49 are allowed to remain in the position shown in Fig. 8 until the operation of securing the type bar upon the disk is completed, the means for performing this operation not being shown. However, the press upon which the support 22 is mounted is provided with a plurality of punches corresponding in number to the openings 19 in the disk 16 and spaced to register with the same. The punches when lowered into engagement with the tongues 14 of the type bar serve to force the material thereof into the openings 19, as indicated at 20 in Fig. 6.

Similar punches, not shown, are projected upwardly into position to engage the tongues 14 at the lower side of the type bar when the disk 16 is lowered against the action of the springs 24 by the pressure exerted thereon through the medium of certain parts carried by the punch holding head of the press. Thus the two punching operations which force the material of the tongues 14 into the holes 19 of the disk are performed simultaneously while the flexible strip continues to hold the type bar in position upon the disk as shown in Fig. 8. After the punching operations are completed, the cams 46 and 49 are moved to release position, thus permitting the slide block 34 to be returned to normal position and likewise the strip holding members 27 which are returned by the spring 37a to the position shown in Fig. 7.

We claim:

1. A type bar having spaced type characters integrally formed on its front face and having notches at different points in its rear face to facilitate shaping it to provide a bar on which the faces of certain of the characters lie in planes inclined one relative to another.

2. As an article of manufacture, a type bar having spaced type characters formed thereon, the bar being shaped to effect angular disposition of the work engaging faces of said characters, in which relation said faces remain undistorted and each in a plane inclined relative to the plane of another, the bar having parts formed thereon for securing it upon a holder.

3. As an article of manufacture, a type bar having spaced type characters formed thereon, said bar being reduced in cross section at points between the type characters to facilitate shaping of the bar to effect angular disposition of the type characters, in which relation the work engaging faces of the characters lie in planes inclined one with respect to another, and spaced members on the bar for securing it upon a holder.

4. As an article of manufacture, a type bar having spaced type characters formed thereon, said bar having portions thereof reduced in cross section at points between the type characters to facilitate shaping of the bar without distortion of the characters, said bar having a plurality of pairs of projecting members thereon, the members of each pair extending opposite one of the type characters and adapted to engage opposite sides of a holder for the bar.

5. As an article of manufacture, a substantially curved type bar having a plurality of printing characters arranged on its outer peripheral edge in spaced relation one to another, the bar having a series of spaced abutments on its inner edge directly opposite certain of the type characters and adapted to engage a holder for the bar and to transmit thereto the pressure on the type characters during the printing operations.

6. As an article of manufacture, a substantially curved type bar provided with a plurality of printing characters on its peripheral edge having their printing faces in different planes, the bar having an inner edge portion for engaging a holder therefor and also having a plurality of spaced portions for engagement with the holder to secure the bar thereon.

7. In a device of the class described, a holder having a series of openings therein, and a type carrying bar mounted upon the holder, said bar having extended portions engaging the holder, parts of said extended portions being extruded to engage the holder within said openings whereby to secure the bar upon the holder.

8. In a device of the class described, a holder having a series of openings formed therein, a type carrying bar mounted upon the holder and having a plurality of pairs of extended securing members, each pair of said members engaging opposite sides of the holder in overlying relation with respect to one of said openings, and means on said pairs of securing members engaging the holder within the openings to secure the type bar upon the holder.

9. In a device of the class described, a disk-like holder having a series of openings adjacent a portion of its peripheral edge, and a curved type bar having a plurality of spaced printing characters arranged upon its peripheral edge, said bar being mounted upon the peripheral edge of the holder and having a plurality of pairs of extended securing members, each pair of said members being arranged opposite one of the printing characters and adapted to straddle the holder in overlying relation with respect to one of said openings, and means on said members engaging the holder within said openings to secure the type bar upon the holder.

10. A unitary substantially arcuate type bar having a plurality of type characters integrally formed on its front face, said bar having a plurality of spaced portions at each side thereof extending rearwardly of said front face and adapted for connection with a supporting member for the bar.

11. A unitary type bar having a front face portion provided with a plurality of integrally formed type characters, a rear face portion of said bar having a plurality of notches to facilitate forming of the bar to correspond to a predetermined shape without distortion of the printing faces of said characters.

12. A unitary type bar having an unbroken front face provided with one or more type characters integrally formed thereon, said bar having a rearwardly disposed edge portion notched at a plurality of points between its ends, the bar having rearwardly extending spaced portions for connecting it with supporting means therefor.

13. As an article of manufacture, a type bar having type characters formed thereon, said bar having transverse slots at points between the characters and having spaced portions between the slots at each side of the bar in rear of the type characters for attaching the bar to a holder.

WILLIAM UHL.
GORDON W. WOLFE.